US011263848B2

(12) United States Patent
Suleiman et al.

(10) Patent No.: US 11,263,848 B2
(45) Date of Patent: Mar. 1, 2022

(54) TEMPORARY AND CUSTOMIZED VEHICLE ACCESS

(71) Applicant: FORD GLOBAL TECHNOLOGIES, LLC, Dearborn, MI (US)

(72) Inventors: Ali Mohamad Suleiman, Dearborn, MI (US); Vijayababu Jayaraman, Novi, MI (US); Mohamad Nasser, Dearborn Heights, MI (US); Karl Nathan Clark, Belleville, MI (US); John Naum Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 529 days.

(21) Appl. No.: 15/992,827

(22) Filed: May 30, 2018

(65) Prior Publication Data

US 2019/0371104 A1 Dec. 5, 2019

(51) Int. Cl.

| G07C 9/00 | (2020.01) |
|---|---|
| G07C 5/00 | (2006.01) |
| H04W 12/06 | (2021.01) |
| H04L 29/06 | (2006.01) |
| G06F 21/60 | (2013.01) |

(52) U.S. Cl.
CPC ......... *G07C 9/00896* (2013.01); *G07C 5/008* (2013.01); *H04L 63/108* (2013.01); *H04W 12/06* (2013.01); *G06F 21/606* (2013.01); *H04L 63/0442* (2013.01); *H04L 2209/80* (2013.01); *H04L 2209/84* (2013.01)

(58) Field of Classification Search
CPC ...... G07C 9/00896; G07C 5/008; G07C 9/00; G07C 5/00; H04L 63/108; H04L 2209/80; H04L 63/0442; H04L 2209/84; H04L 29/06; H04W 12/06; G06F 21/606; G06F 21/10; G06F 21/604; G06F 21/44
See application file for complete search history.

(56) References Cited

U.S. PATENT DOCUMENTS

| 2013/0290191 | A1* | 10/2013 | Dischamp | G06Q 10/02 |
|---|---|---|---|---|
| | | | | 705/51 |
| 2015/0206206 | A1 | 7/2015 | Puente et al. | |
| 2016/0050699 | A1 | 2/2016 | Boss et al. | |
| 2017/0018130 | A1* | 1/2017 | Robinson | G07C 9/00309 |
| 2018/0270066 | A1* | 9/2018 | Doyon | H04L 67/1008 |
| 2019/0089530 | A1* | 3/2019 | Wu | H04L 9/0838 |
| 2019/0266346 | A1* | 8/2019 | O'Brien | G06K 9/00718 |

* cited by examiner

*Primary Examiner* — Quazi Farooqui
(74) *Attorney, Agent, or Firm* — Michael J. Spenner; Brooks Kushman P.C.

(57) ABSTRACT

A vehicle includes a processor programmed to validate, using a public key of a lender device, authenticity of a file including permissions for a borrower device signed using a private key of a lender device, and responsive to validating, using a public key of a borrower device, a session request from the borrower device signed with a private key of the borrower device, establish a secure connection with the borrower device over which access to the vehicle is granted per the permissions.

12 Claims, 3 Drawing Sheets

TEMPORARY AND CUSTOMIZED VEHICLE ACCESS

TECHNICAL FIELD

Aspects of the disclosure generally relate to providing temporary and customized access to vehicles.

BACKGROUND

Traditionally, to provide access to a vehicle a user may lend his physical key to another user. This requires a first physical exchange of the key with the user servicing or borrowing the vehicle, and a second physical exchange back once the vehicle is returned.

SUMMARY

In one or more illustrative embodiments, a vehicle includes a processor programmed to validate, using a public key of a lender device, authenticity of a file including permissions for a borrower device signed using a private key of a lender device, and responsive to validating, using a public key of a borrower device, a session request from the borrower device signed with a private key of the borrower device, establish a secure connection with the borrower device over which access to the vehicle is granted per the permissions.

In one or more illustrative embodiments, a method includes sending, by a recipient device to a vehicle, a file from a lender device signed using a private key of the lender device and including a public key of the recipient device; and establishing a secure session to access the vehicle using a session key received from the vehicle responsive to sending a session request to the vehicle signed using a private key of the recipient device.

In one or more illustrative embodiments, a system includes a processor of a mobile device, programmed to send, to a vehicle, a file from a lender device signed using a private key of the lender device and including a public key of the recipient device, and establish a secure session to access the vehicle using a session key received from the vehicle responsive to sending a session request to the vehicle signed using a private key of the recipient device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To avoid physical transfers of a key from a lender to a borrower, and a second transfer of the key back to the lender, an asymmetric signing infrastructure may be used to allow the current owner to send a signed file that acts as a temporary key, and lists what permissions are granted to the temporary user and the expiration date of the access.

Figure 1:
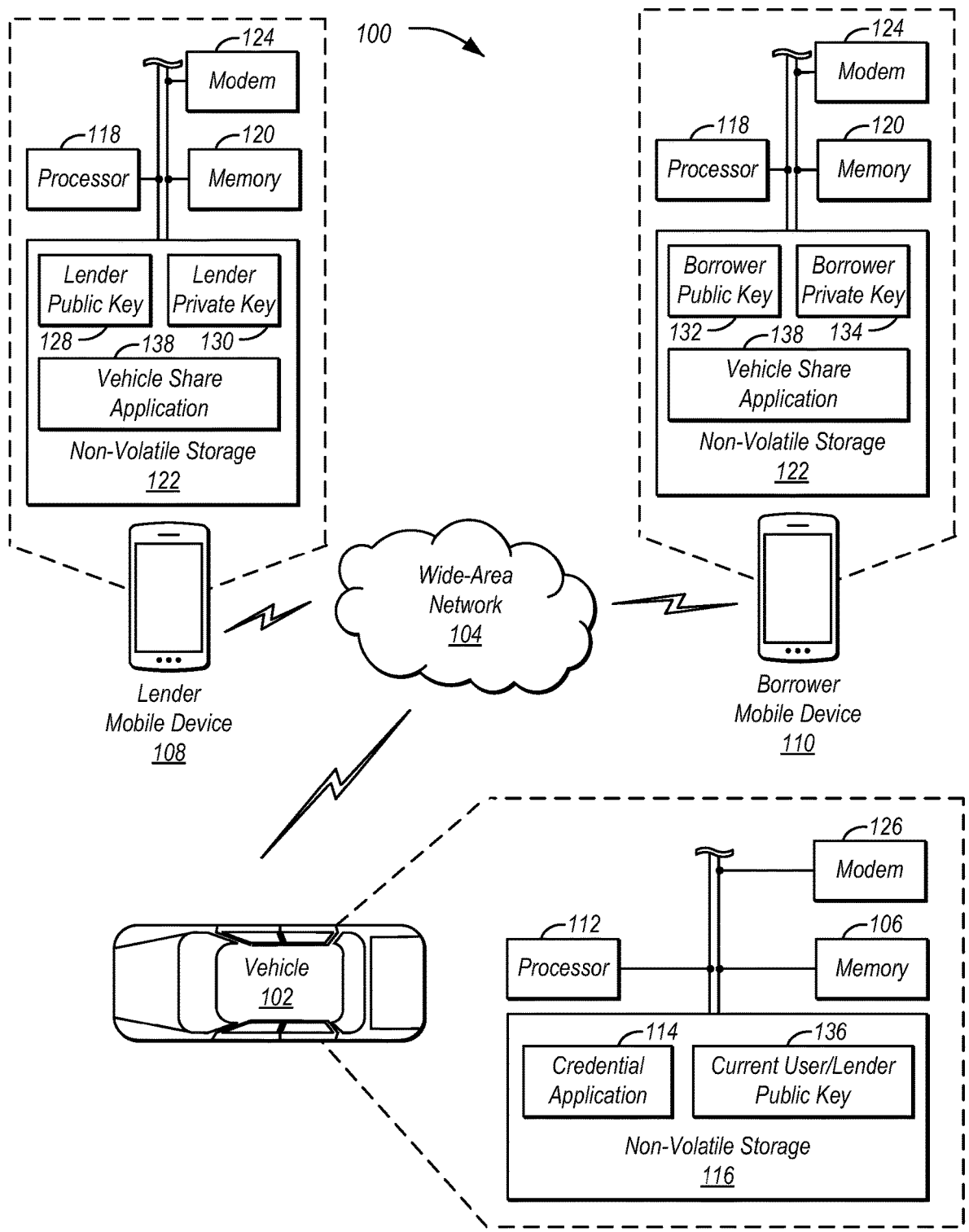
FIG. 1 illustrates an example diagram of a system configured to provide telematics services to a vehicle.

FIG. 1 illustrates an example system 100 for providing temporary and customized access to vehicles 102. As shown, the system 100 includes a vehicle 102, a lender mobile device 108, and a borrower mobile device 110 that are each configured to communicate over a wide-area network 104.

The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and handsfree calling. In an example, the system 100 may include the SYNC system manufactured by The Ford Motor Company of Dearborn, Mich. It should be noted that the illustrated system 100 is merely an example, and more, fewer, and/or differently located elements may be used.

The vehicle 102 may include memory 106 and one or more processors 112 configured to perform instructions, commands, and other routines in support of the processes described herein. For instance, the processor 112 may be configured to execute instructions of a credential application 114 to provide features related to vehicle 102 access to various users. Such instructions and other data may be maintained in a non-volatile manner using a variety of types of computer-readable storage medium 116. The computer-readable medium 116 (also referred to as a processor-readable medium or storage) includes any non-transitory medium (e.g., a tangible medium) that participates in providing instructions or other data that may be read by the processor 112. Computer-executable instructions may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

The processor 112 may be further configured to communicate with other components of the vehicle 102 via one or more in-vehicle networks. The in-vehicle networks may include one or more of a vehicle controller area network (CAN), an Ethernet network, or a media oriented system transfer (MOST), as some examples. The in-vehicle networks may allow the processor 112 to communicate with other vehicle 102 systems, such as a global positioning system (GPS) module configured to provide current vehicle 102 location and heading information, and various vehicle electronic control units (ECUs) configured to perform various functions for the vehicle 102. As some non-limiting possibilities, the vehicle ECUs may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

Similar to the vehicle 102, the mobile devices 108, 110 may each include one or more processors 118 configured to execute instructions of mobile applications loaded to a memory 120 of the mobile devices 108, 110 from storage medium 122 of the mobile device 108, 110.

The wide-area network 104 may provide communications services, such as packet-switched network services (e.g., Internet access, VoIP communication services), to devices connected to the wide-area network. An example of a wide-area network 104 may include a cellular telephone network. The mobile devices 108, 110 may have network connectivity to the wide-area network 104 via a modem 124 of the mobile devices 108, 110. The vehicle 102 may have network connectivity to the wide-area network 104 via a vehicle modem 126. To facilitate the communications over the wide-area network 104, mobile devices 108, 110 and vehicles 102 may be associated with unique device identifiers (e.g., mobile device numbers (MDNs), Internet protocol (IP) addresses, etc.) to identify the communications of the respective device over the wide-area network 104.

The system 100 may make use of public-key cryptography. Such systems utilize pairs of keys for authentication and encryption. Each pair of keys includes a public key which may be disseminated widely, and a private key which is known only to the owner. A lender public key 128 and a lender private key 130 may be installed to the storage 122 of the lender mobile device 108, while a borrower public key 132 and a borrower private key 134 may be installed to the storage 122 of the borrower mobile device 110. Additionally, the public key of the current user or lender of the vehicle 102 may be installed to the storage 116 of the vehicle 102.

A vehicle share application 138 may be installed to the lender mobile device 108. When executed by the lender mobile device 108, the vehicle share application 138 may cause the lender mobile device 108 to receive, from a current owner or possessor of the vehicle 102, permissions for use of the vehicle 102 to be provided to a borrower and when they will expire, and provide the permissions in a file to the borrower mobile device 110.

The vehicle share application 138 may also be installed to the borrower mobile device 110. When executed by the borrower mobile device 110, the vehicle share application 138 may cause the borrower mobile device 110 to receive the file from the lender mobile device 108, sign the file, and send the file to the vehicle 102.

When executed by the vehicle 102, the credential application 114 may cause the vehicle 102 to receive the signed file from the borrower mobile device 110, validate the signed file, and grant vehicle 102 access to the borrower mobile device 110. Accordingly, this solution provides a way of giving access to the vehicle 102 without communication with a centralized server, as the vehicle 102 itself acts as the centralized server, and is capable of validating incoming requests.

Figure 2:
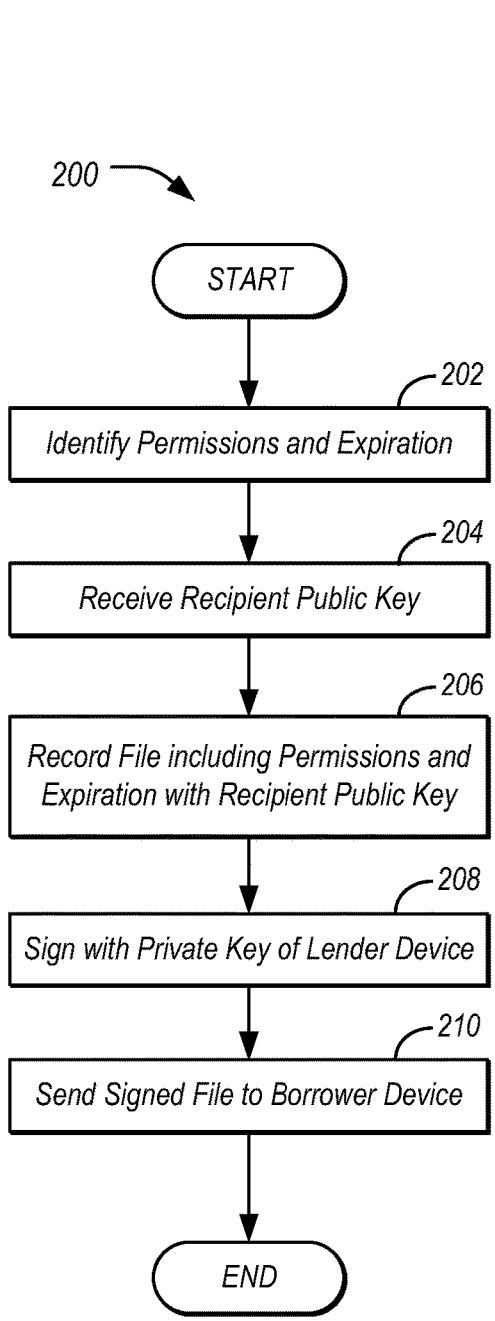
FIG. 2 illustrates an example process for initiating temporary access to a vehicle by a lender of the vehicle.

FIG. 2 illustrates an example process 200 for initiating temporary access to a vehicle 102 by a lender of the vehicle 102. The lender may be an owner of the vehicle 102. In other cases, the lender may be another user in possession of the vehicle 102 such as a current vehicle-share user. In an example, the process 200 may be implemented by the processor 118 of the lender mobile device 108 executing the vehicle share application 138. In the process 200, it should be noted that the communications between the vehicle 102, lender mobile device 108, and borrower mobile device 110 may be performed over a connection over the wide-area network 104. In other examples, these communications may additionally or alternately be performed over a Wi-Fi, BLUETOOTH, or other local connection.

At operation 202, the lender mobile device 108 identifies permissions and expiration of the permissions. In an example, the owner or other user in possession of the vehicle 102 may utilize a user interface of the lender mobile device 108 to specify information allowing a borrower to use the vehicle 102. This information may include permissions for the borrower to use the vehicle 102 (e.g., as a full user, as a valet or teenage user with a maximum speed restriction, etc.) This information may also include an expiration date and time for the permissions. Or, the information may include a maximum amount of time that the vehicle 102 may be used, e.g., one hour.

At operation 204, the lender mobile device 108 receives the public key 132 of the recipient of the borrowing mobile device 110. In an example, the public key 132 may be received by the lender mobile device 108 from the borrower mobile device 110 (e.g., via a connection over the wide-area network 104). In other cases, the public key 132 may be received via a Wi-Fi, BLUETOOTH, or other local connection. At 206, the lender mobile device 108 records a file including the permissions, expiration, and a public key of the recipient. At operation 208, the lender mobile device 108 signs the file using a private key 128 of the lender mobile device 108. The private key 128 of the lender mobile device 108 may have been stored to and retrieved from the storage 122 of the lender mobile device 108. The lender mobile device 108 sends the signed file to the borrower mobile device 110 at 210.

Figure 3:
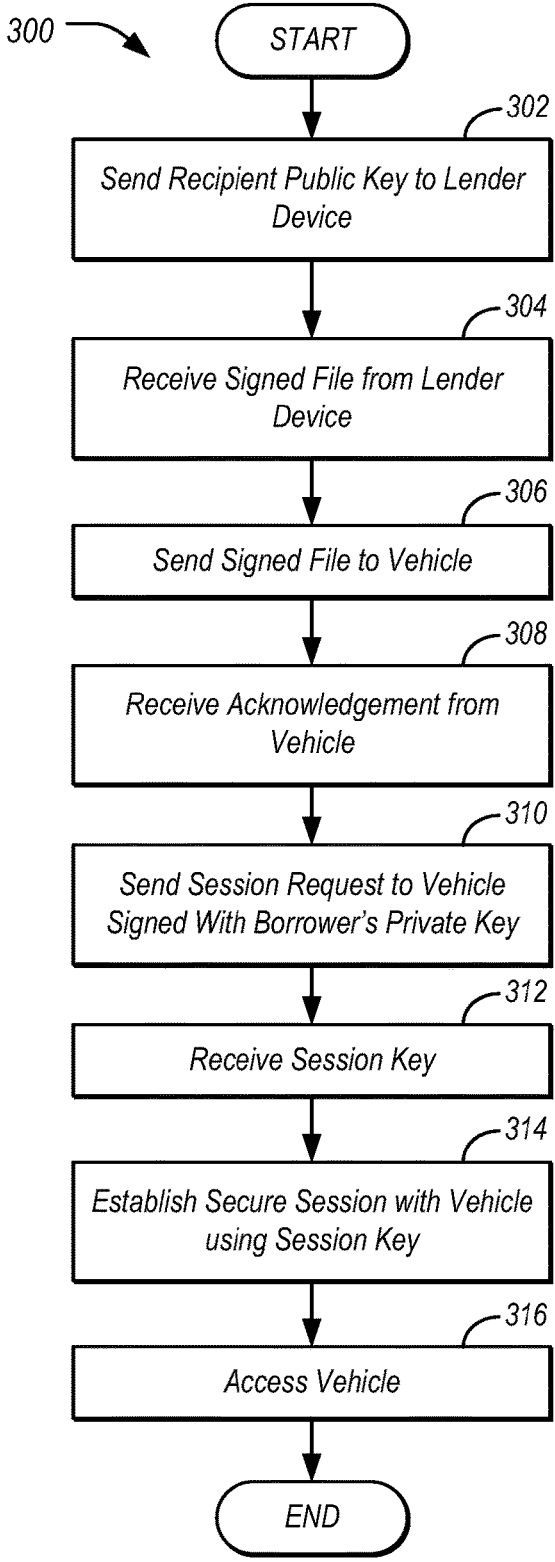
FIG. 3 illustrates an example process for providing temporary access to a vehicle using the borrower mobile device.

FIG. 3 illustrates an example process 300 for providing temporary access to a vehicle 102 using the borrower mobile device 110. The process 300 may be initiated in connection with the process 200. In an example, the process 300 may be implemented by the processor 118 of the borrower mobile device 110 executing the vehicle share application 138. As with the process 200, in the process 300, the communications between the vehicle 102, lender mobile device 108, and borrower mobile device 110 may be performed via a connection over the wide-area network 104, or over Wi-Fi, BLUETOOTH, or another local connection.

At 302, the borrower mobile device 110 sends the recipient public key 132 to the lender mobile device 108. In an example, operation 302 is performed by the borrower mobile device 110 in relation to operation 204 of the process 200. The public key 132 of the borrower mobile device 110 may have been stored to and retrieved from the storage 122 of the borrower mobile device 110. At 304, similar to as discussed at operation 210 of the process 200, the borrower mobile device 110 receives the signed file from the lender mobile device 108

At operation 306, the borrower mobile device 110 sends the signed file to the vehicle 102. At 308, the borrower mobile device 110 receives acknowledgement of the signed file from the vehicle 102. Similarly, the acknowledgement may be sent via the wide-area network 104 or a local connection.

At 310, the borrower mobile device 110 sends a session request to the vehicle 102 signed with the private key 134 of the borrower. In an example, the borrower mobile device 110 signs the session request using a private key 134 of the borrower mobile device 110. The private key 134 of the borrower mobile device 110 may have been stored to and retrieved from the storage 122 of the borrower mobile device 110.

At 312, the borrower mobile device 110 receives a session key from the vehicle 102. In an example, responsive to receipt of the session key, the vehicle 102 may grant the borrower mobile device 110 a session key that may be used to encrypt traffic between the vehicle 102 and the borrower mobile device 110 for a secure communication session between the vehicle 102 and the borrower mobile device 110. At operation 314, the borrower mobile device 110 establishes a secure session with the vehicle 102 using the session key.

The borrower mobile device 110 accesses the vehicle 102 at 316. This access may be in accordance with the permissions and expiration indicated in the file. After operation 316, the process 300 ends.

Figure 4:
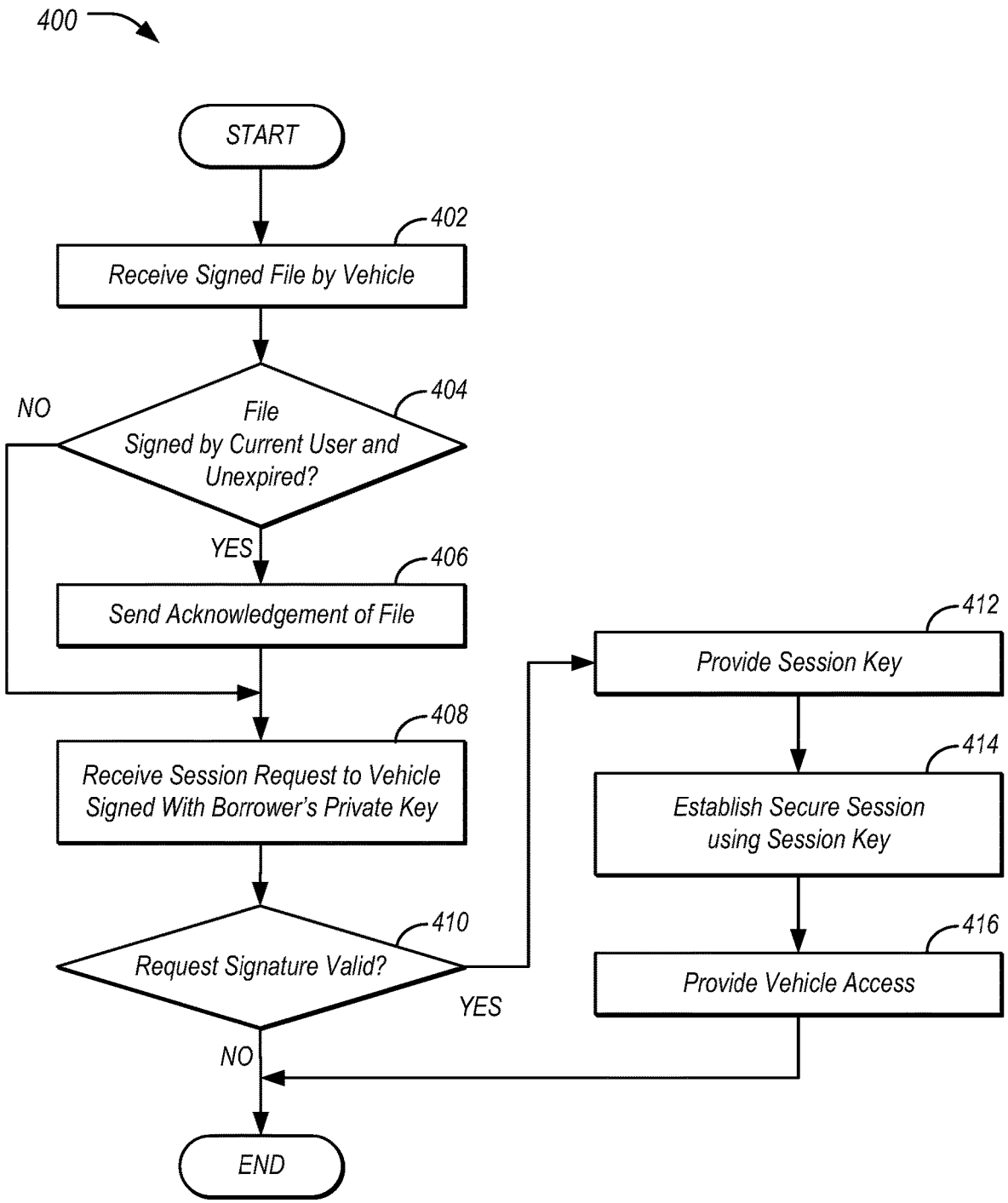
FIG. 4 illustrates an example process for providing temporary access of the borrower mobile device by the vehicle.

FIG. 4 illustrates an example process 400 for providing temporary access of the borrower mobile device 110 to the vehicle 102. In an example, the process 400 may be implemented by the processor 112 of the vehicle 102 executing the credential application 114. As with the processes 200 and 300, in the process 400, the communications between the vehicle 102, lender mobile device 108, and borrower mobile device 110 may be performed over a connection over the wide-area network 104, or over Wi-Fi, BLUETOOTH, or another local connection.

At 402, the vehicle 102 receives the signed file from the borrower mobile device 110. In an example, the signed file may be received from the borrower mobile device 110 as discussed at operation 306.

At operation 404, the vehicle 102 confirms whether the file is signed by the current user of the vehicle 102 and also whether the permissions in the file are unexpired. In an example, the vehicle 102 may utilize a public key 136 of the current user or lender mobile device 108 to ensure that the lender signature of the file is valid. In another example, the vehicle 102 may compare the expiration information of the file to the current time to ensure that the file includes permissions that are still valid for the current time. If the file is determined to be valid, control passes to operation 406. At 406, the vehicle 102 sends an acknowledgement of the file to the borrower mobile device 110. If the file is determined to be invalid, the process 400 ends.

At 408, similar to as discussed above with respect to operation 310 of the process 300, the vehicle 102 receives the session request signed by the private key 134 of the borrower mobile device 110.

At 410, the vehicle 102 determines whether the borrower mobile device 110 signature of the session request is valid. In an example, the vehicle 102 may utilize the public key 132 of the borrower mobile device 110 to ensure that the signature of the session request is valid. If the signature is valid, control passes to operation 412. Otherwise, the process 400 ends.

At 412, similar to as discussed above with respect to operation 312 of the process 300, the vehicle 102 provides the session key to the borrower mobile device 110. At 414, similar to as discussed above with respect to operation 314 of the process 300, the vehicle 102 establishes the secure session between the vehicle 102 and the borrower mobile device 110.

At 416, the vehicle 102 provides access. In an example, the vehicle 102 may allow the borrower mobile device 110 to unlock the vehicle, drive the vehicle 102, add an autonomous vehicle destination, etc. After operation 416, the process 400 ends.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as those of the system controller, generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the system controller may be such computer program products. In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A permissions system comprising:
a lender device;
a recipient device; and
a microprocessor of a vehicle;
the lender device being programmed to:
receive, from the recipient device, a public key of the recipient device,
record a file including permissions for the recipient device to use the vehicle and also the public of the recipient device,
sign, by the lender device, the file using a private key of the lender device,
send the signed file to the recipient device,
the recipient device being programmed to:
receive the signed file from the lender device,
send the signed file to the vehicle to cause the vehicle to validate the signed file using a public key of the lender device,
receive, by the recipient device, an acknowledgement of the signed file from the vehicle indicating that the signed file is validated by the vehicle,
send, to the vehicle, a session request signed using a private key of the recipient device,
receive a session key, from the vehicle, responsive to the vehicle validating the session request using the public of the recipient device as received to the vehicle in the signed file,
the microprocessor of the vehicle being programmed to:
validate, using the public key of the lender device, authenticity of the file including the permissions for the borrower device and the public key of the borrower device, the file being signed using the private key of the lender device,
responsive to validating, using the public key of the borrower device as received in the file, the session request from the borrower device signed with the private key of the borrower device, establish a secure connection with the borrower device using the session key over which access to the vehicle is granted per the permissions, and
expire the access to the vehicle in accordance with expiration information indicative of expiration of the permissions for the borrower device included in the file.

2. The vehicle of claim 1, wherein the permissions include permission to unlock the vehicle.

3. The vehicle of claim 1, wherein the permissions include permission to drive the vehicle.

4. The vehicle of claim 1, wherein the permissions include permission to request the vehicle to autonomously navigate to a destination location.

5. A method comprising:
receiving, by a lender device from a recipient device, a public key of the recipient device;
recording, by the lender device, a file including permissions for the recipient device to use a vehicle and also the public key of the recipient device;
signing, by the lender device, the file using a private key of the lender device;
sending the signed file to the recipient device from the lender device;
receiving the signed file by the recipient device from the lender device;
sending, the signed file from the recipient device to the vehicle to cause the vehicle to validate the signed file using a public key of the lender device;
receiving, by the recipient device, an acknowledgment of the signed file from the vehicle indicating that the signed file is validated by the vehicle,
sending, from the recipient device to the vehicle, a session request signed using a private key of the recipient device,
receiving a session key, to the recipient device from the vehicle, responsive to the vehicle validating the session request using the public key of the recipient device as received to the vehicle in the signed file, and
establishing a secure session between the recipient device and the vehicle to access the vehicle using the session key,
wherein the file includes information indicative of expiration of the permissions for the recipient device, and further comprising receiving an indication of expiration of the access to the vehicle in accordance with the expiration information.

6. The method of claim 5, the permissions including permission to unlock the vehicle.

7. The method of claim 5, the permissions including permission to drive the vehicle.

8. The method of claim 5, the permissions including permission to request the vehicle to autonomously navigate to a destination location.

9. A non-transitory computer-readable medium including instructions of a vehicle share application that when installed to both a lender device and a recipient device, cause the lender device and the recipient device to collectively perform permission lending operations including to:
receive, by the lender device from the recipient device, a public key of the recipient device,
record, by the lender device, a file including permissions for the recipient device to use a vehicle and also the public key of the recipient device,
sign, by the lender device, the file using a private key of the lender device,
send the signed file to the recipient device from the lender device,
receive the signed file by the recipient device from the lender device,
send the signed file from the recipient device to the vehicle to cause the vehicle to validate the signed file using a public key of the lender device,
receive, by the recipient device, an acknowledgement of the signed file from the vehicle indicating that the signed file is validated by the vehicle,
send, from the recipient device to the vehicle, a session request signed using a private key of the recipient device,
receive a session key, to the recipient device from the vehicle, responsive to the vehicle validating the session request using the public key of the recipient device as received to the vehicle in the signed file, and establish a secure session between the recipient device and the vehicle to access the vehicle using the session key;

wherein the file includes information indicative of expiration of the permissions for the recipient device.

10. The medium of claim 9, wherein the permissions include permission to unlock the vehicle.

11. The medium of claim 9, wherein the permissions include permission to drive the vehicle.

12. The medium of claim 9, wherein the permissions include permission to request the vehicle to autonomously navigate to a destination location.

\* \* \* \* \*